United States Patent [19]

Malick

[11] 3,836,923

[45] Sept. 17, 1974

[54] CONTRAST CONTROL APPARATUS FOR A CAMERA

[76] Inventor: Christopher B. Malick, 2342½ Broadway, Boulder, Colo. 80302

[22] Filed: Nov. 15, 1971

[21] Appl. No.: 198,672

[52] U.S. Cl. ................................. 354/32, 355/67
[51] Int. Cl. .......................................... G03b 27/72
[58] Field of Search ........................ 355/67, 68, 71

[56] References Cited
UNITED STATES PATENTS

| | | | |
|---|---|---|---|
| 1,244,159 | 10/1917 | Adsit | 95/10 C |
| 2,095,312 | 10/1937 | Cahn | 95/10 C |
| 2,621,569 | 12/1952 | Glassey | 95/1 |
| 3,096,176 | 7/1963 | Craig | 355/68 X |
| 3,484,165 | 12/1969 | Denner | 355/67 |
| 3,577,898 | 5/1971 | Bragg | 355/71 |

Primary Examiner—John M. Horan
Attorney, Agent, or Firm—Hofgren, Wegner, Allen, Stellman & McCord

[57] ABSTRACT

An apparatus for reducing the contrast of image light received by a camera and the film therefor including a device for obliquely adding light to the resolving lens of a camera to produce diffused light through the lens by a "flare" effect so that the contrast can be reduced to a level which films can more effectively accommodate; there being provided a control for varying the amount of added light to produce this flare effect and thus control the contrast by increasing by equal amounts the absolute intensity of the bright and dim areas of a scene to be photographed so that the ratio of intensity of the bright to dim areas of a scene will be reduced.

18 Claims, 17 Drawing Figures

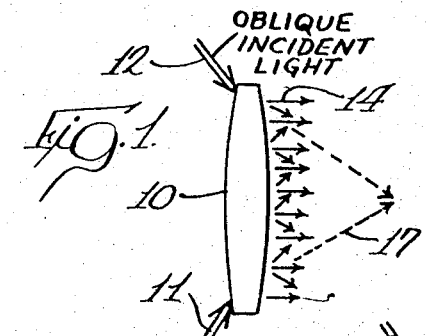
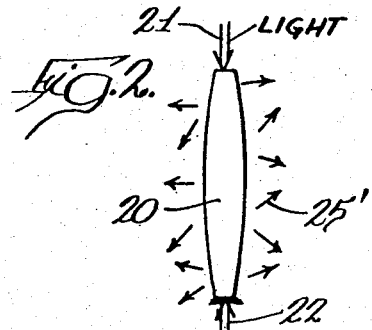
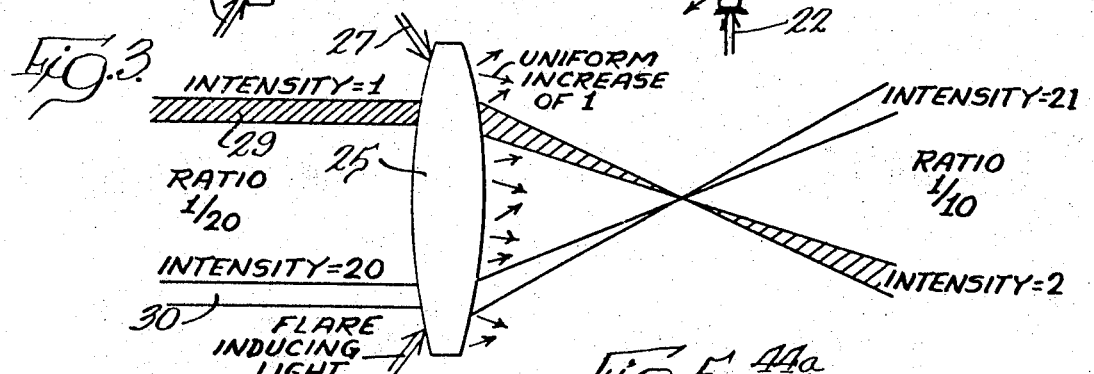
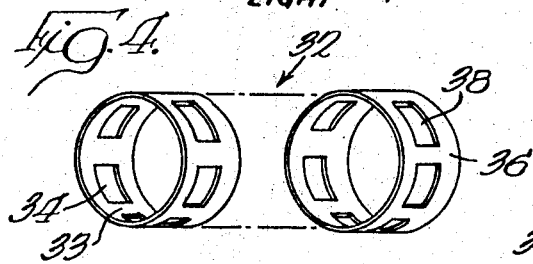
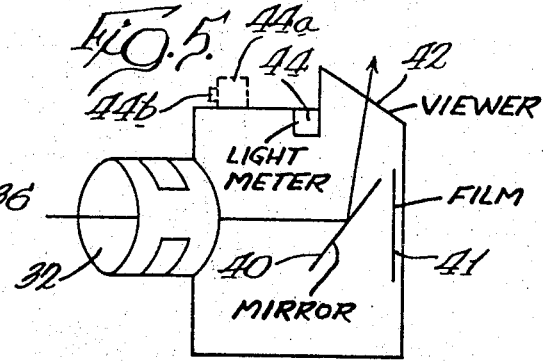
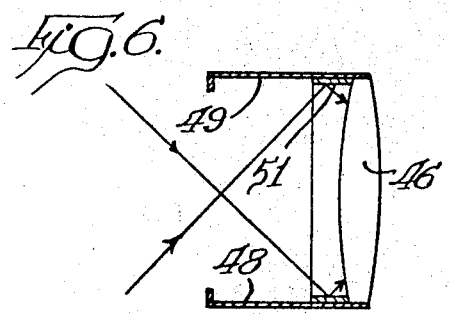
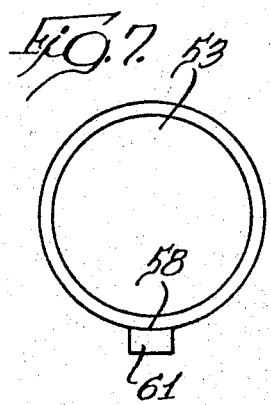
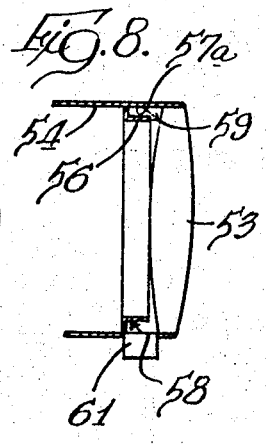
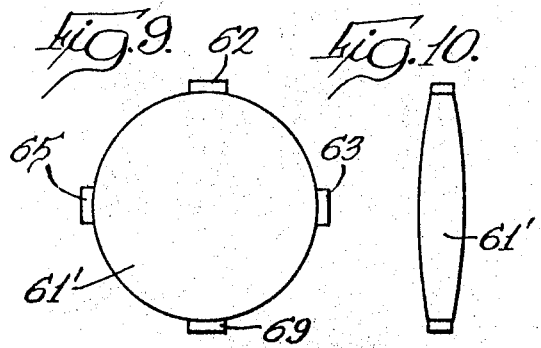
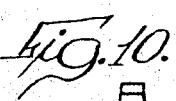

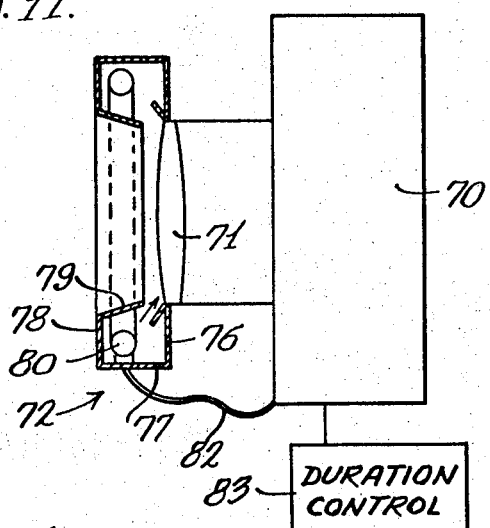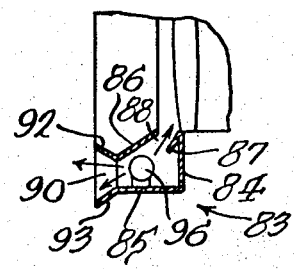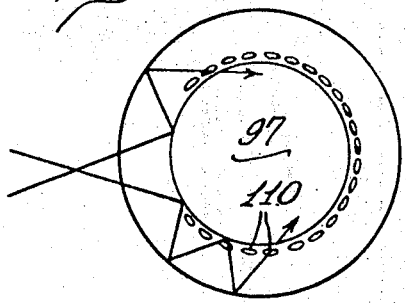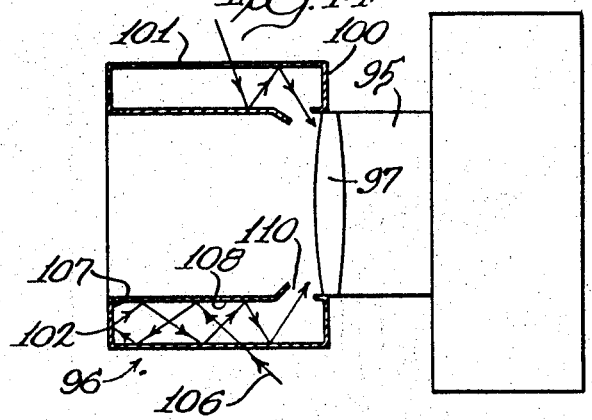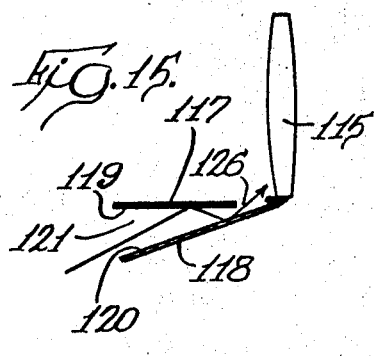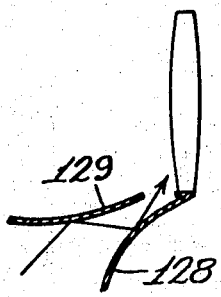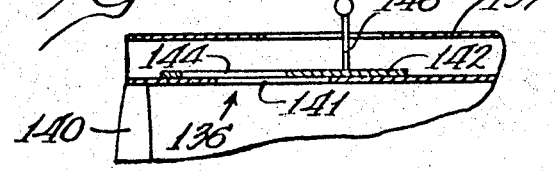

CONTRAST CONTROL APPARATUS FOR A CAMERA

BACKGROUND OF THE PRESENT INVENTION

For a given camera and a given film there is a maximum contrast ratio, i.e., the ratio of dim object areas to bright object areas, which the combination can effectively reproduce without washed out or completely underexposed areas on the negative. If the ratio of the light intensity of bright to dim areas in a photographic scene exceeds this level, a lack of definition in the negative results. The approximate contrast ratio acceptable by color film is 1:6. If the contrast exceeds this level, detail is lacking at either or both ends of the brightness scale. The result is similar with most black and white films if the contrast level exceeds about 1:16. Many scenes, such as outdoor ones, may have a contrast ratio of 1:200 which is completely unacceptable for any commercially available film. If the photographer adjusts the aperture of his lens to the extremely bright areas, definition is completely lacking in the dark areas. On the other hand, if he adjusts the aperture to get detail in the dark areas, the bright areas will appear "washed out."

As an example, if a subject is in a deep shadow on a bright day at the beach and the photographer sets his aperture according to the light reading of the subject, the bright background sand will turn out overexposed and without any texture. If, on the other hand, he sets the aperture according to the overall intensity of the entire view, his subject will lack detail and be underexposed. For many photographers, this creates a very difficult and frustrating problem.

There have in the past been attempts to solve this problem. One such solution lies in intentionally overexposing the negative and then underdeveloping it which will result in a reduced contrast. To effect this, the photographer must recognize that his contrast level is too high and then deliberately over-expose his film and then reduce the development by an appropriate, but incalculable, amount. The disadvantage in this method of dealing with the excessive contrast problem is that the film for each negative must be handled separately which is very difficult especially with rolled film, since each picture requires a different degree of processing because of the different contrast in each picture.

Another prior known method in dealing with this problem is to use softer grades of paper on which the print is made. However, this restricts the photographer to the type of print which results and this is often undesirable.

It has also been broadly recognized that contrast control may be effected by adding light to the film during aperture opening. Generally, this has been effected in one of two ways. The first has been the provision of a light source behind the resolving lens within the camera itself, and such an arrangement is shown in U.S. Pat. No. 3,545,859. This has several disadvantages, one being that the light source within the camera makes the camera size excessively large, and also since the added light is not passing through the lens, it must be measured and controlled entirely separately from the image light passing through the lens itself, which also has to be measured and controlled.

A second prior art approach is to introduce supplementary light around the outside, but beyond the perimeter of the lens so that the light does not pass through the lens. This arrangement has the same disadvantages as that shown in U.S. Pat. No. 3,545,859, and moreover has additional disadvantages of consuming too much room on a small camera, and also concentrating light on the periphery of the film rather than evenly over the image area of the film. Moreover, since the light coming from the lens itself and from the supplementary light would be in different amounts, they must be measured separately and calculations made to balance one against the other to assure a proper exposure.

A further problem in prior art supplementary light arrangements is that in single-lens reflex cameras having behind the lens light meters, the light meters measure only the amount of light passing through the lens so that the light meters would not get an accurate reading in these prior art devices since they would not measure the supplementary light.

It is the primary object of the present invention to obviate these problems in prior art constructions and methods of compensating for excessive contrast in a camera.

SUMMARY OF THE PRESENT INVENTION

In accordance with the present invention, a plurality of devices, in different embodiments, are provided for controlling the contrast of a scene as viewed by a camera. This is accomplished by the provision of a device which controllably adds either natural or artificial light through the resolving lens of the camera at a sufficiently oblique incident angle so that it produces a light flare or a general diffusion of added light rather than resolution of the added light.

When a high contrast scene is resolved to an image by a lens, this flare causes a reduction in contrast by increasing the intensity of light uniformly across the image. For example, if one bright area of a scene has an intensity of 20 on an arbitrary scale, and a second dim area has an intensity of 1 on the same scale, the contrast ratio is 1:20. Light introduced by the present devices at an oblique angle of incidence causes flare in the lens and a resulting increase in intensity, for example one unit, uniformly over the image; thus, the first area now has an intensity of 21 units, while the second area's intensity is increased to 2 units. The resulting ratio of intensities has now drastically changed to 2:21 or about 1:10, thereby reducing contrast by approximately one-half, and permitting a given camera and film to provide sharp, clear pictures in high contrast situations.

The present flare light controls permit the photographer to control contrast in each situation while he is taking his pictures and he will not have to deal with it in developing or printing processes. Each individual negative can be controlled separately when shooting. All the film is then treated in the same way during developing and printing. Moreover, the degree of contrast can be controlled by direct observation in a single-lens reflex camera. While in the present embodiments the flare control devices are made part of the camera, they may be constructed as attachments or separate elements to the camera.

By passing the extraneous light into or through the lens itself, its effect and amount are observed at the same time as, and superimposed on, the desired image. Moreover, when the mirror of a single-lens reflex-type camera flips up out of the way, there is no disturbance of the extraneous light source as there is in prior art light adding devices. Since the extraneous light is coming through the lens with the image light, the mirror, shutter, light meter, etc., treat and accommodate the added light in the same way as the image light itself.

BRIEF DESCRIPTION OF THE DRAWINGS

FIG. 1 is an illustration of a camera resolving lens illustrating the present method of adding incident oblique light to the lens;

FIG. 2 is an illustration of a camera resolving lens illustrating the present method of producing added light diffusion by light introduction on the rim of the lens;

FIG. 3 is an illustration of a camera resolving lens showing the method of contrast reduction in accordance with the present invention;

FIG. 4 is an exploded view of an apertured hood for controlling flare and contrast in accordance with the present invention;

FIG. 5 is a cross-section of a single-lens reflex camera with the contrast control of FIG. 4 attached thereto;

FIG. 6 is an illustration of a camera resolving lens with a mirrored hood according to the present invention;

FIGS. 7 and 8 are front and side views of a contrast control employing a reflector and an artificial light source;

FIGS. 9 and 10 are front and side views of a contrast control according to the present invention employing discrete artificial light sources;

FIG. 11 is a schematic view of a contrast control attachment employing artificial light;

FIG. 12 is a fragmentary view of a modified form of the contrast control of FIG. 11;

FIGS. 13 and 14 are front and side views of a contrast control hood according to a further embodiment of the present invention;

FIG. 15 is a schematic illustration of a reflective contrast control according to a further embodiment of the present invention;

FIG. 16 is a schematic illustration of a contrast control similar to that shown in FIG. 15; and FIG. 17 is a still further modified contrast control having an axially slidable light control.

DETAILED DESCRIPTION OF THE PREFERRED EMBODIMENTS

Referring to the drawings, the basic principles of the present invention are illustrated in FIGS. 1–3. As shown in FIG. 1, a resolving lens 10 is illustrated which is intended to represent throughout the drawings the main resolving lens of a camera. By adding light at an oblique angle as indicated at 11 and 12, a flare effect will be produced which results in a general diffusion of light indicated by rays 14, 15 etc. on the image side of the lens 10. It should be understood that the oblique incident light 11 and 12 is added from the object side of the lens so that it passes through the lens and further illuminates the image. The term general diffusion is intended to be in differentiation to the term resolution.

As seen in FIG. 2, the diffusion or flare effect can also be achieved by adding light at the rim of lens 20 as indicated by rays 21 and 22 which produce diffused light 25' on the image side of the lens. Within the meaning of the disclosure and claims, this rim lighting is within the scope of the term oblique light discussed above.

As viewed in FIG. 3, lens 25 has obliquely incident light 27 added to image rays 29 and 30 which on the object side of the lens 25 have an arbitrary intensity respectively of 1 and 20. As a result of the uniform light addition by rays 27, the intensity of light rays 29 after passing through the lens is 2 while the intensity of light rays 20 after passing through the lens is 21 providing a contrast ratio of approximately 1:10 as opposed to the contrast ratio of 1:20 entering the camera resolving lens.

Illustrated in FIG. 4 is a contrast or flare control device 32. Control device 32 includes an annular hood 33 adapted to be fixed around the resolving lens of a camera with apertures 34 positioned closely adjacent but on the object side of the lens. Surrounding the ring or hood 33 is a second hood 36 which is rotatably mounted with respect to the ring 33. The ring or hood 36 has apertures 38 which variably register with apertures 34 upon rotation of the ring so that the amount of added light or the amount of desired flare may be controlled as desired. This permits the photographer to adjust to the particular contrast situation encountered.

As seen in FIG. 5, the flare control device 32 is illustrated attached to a single-lens reflex camera including mirror 40, film 41, viewer 42 and light meter 44. Note that light meter 44 picks up not only the image light, but also the flare light from flare control 32. From the light meter, the aperture adjustment may be easily made and overexposure prevented, producing excellent results.

The flare inducing light need not be introduced in front of the first lens element as shown in FIGS. 4 and 5, but could be introduced at any or all of the lens elements. With cameras other than single-lens reflex cameras, the same amount of flare may be introduced on the viewing lens as is introduced in the camera lens, so that the flare and its effect on contrast can be directly seen and sensed by the light meter and control. When a separate light meter is used, the light increase may be closely approximated and adjusted by using tables or guides. (A calibration scale may be provided to indicate changes in aperture for different amounts of diffusion light introduced. Alternatively, the photographer can "bracket" his exposure by taking two or three shots at varying aperture settings, to secure one optimum exposure.) Alternatively, a second light producing mechanism may be used with the light meter and calibrated with the main "flare" inducing mechanism on the camera lens, thereby obtaining a more exact reading of the amount of light increase the flare was causing in the camera lens. Such a flare inducing device is shown in dotted lines at 44b on light meter 44a in FIG. 5.

As seen in FIG. 6, a resolving lens 46 has a conventional hood 48 on the object side thereof with the hood being provided on the interior surface 49 with an annular reflector 51 that provides oblique light to lens 46 producing the desired flare effect. The continuous reflective surface results in flare inducing light being introduced, if desired, around all of the perimeter of the lens making the flare somewhat more uniform.

As seen in FIGS. 7 and 8, artificial light may be employed to produce the flare effect. Resolving lens 53 has a hood 54 attached thereto having an interior receiving an annular reflective member 56 having reflective surfaces 57 and 57a that are split as at 58 in FIG. 7 to permit light from an artificial light source 61 to enter the hood and reflect from the reflective surfaces 57 and 57a obliquely through opening 59 to the lens 53.

An additional artificial light flare inducing device is illustrated in FIGS. 9 and 10 where a resolving lens 61' is provided having discrete light sources 62, 63, 64 and 65 spaced at 90° intervals about the periphery of the lens 61'. The amount of light is controlled by controlling the amount of artificial light and this gives a close control of the flare effect.

In the embodiment of the invention illustrated in FIG. 11, the supplementary light source is introduced for finite and controllably varying periods less than the time during which the image light illuminates and registers upon the negative. Also, there may be provided means to vary the duration of the supplementary light allowed to impinge on and through the lens thereby further controlling its quantitative effect on the negative. These controls can be used in any desired combination.

Moreover, the embodiment illustrated in FIG. 12 permits the flare light source to be employed to illuminate the object being photographed.

As seen in FIG. 11, a camera 70 is illustrated having a resolving front lens 71 and a flare control 72 according to the present invention. The flare control 72 is fixed to the lens mount 75 and includes a rear wall 76, an outer wall 77, a front wall 78 and an inside wall 79. Mounted within the walls is a circular flash tube 80 that is synchronized with the camera shutter through a suitable wire 82. Also provided is a duration control 83 that controls the length of time the light tube 80 is illuminated as described above.

As shown in FIG. 12, a similar construction is provided that serves not only to provide flare light, but also flash to illuminate the object being photographed. Flare control and flash combination 83 is seen to consist of a rear wall 84, an outside wall 85, a front wall 86, and a bottom wall 87 defining a slit 88 for introducing flare light to produce flare through the associated lens. The walls 85 and 86 are spaced with the resulting slit 90 being shielded by shield members 92 and 93, providing an annular opening so that the annular flash tube 96 illuminates the object and also is the source of light for the flare effect. It should be understood that the units 72 and 83 need not be mounted directly on the lenses shown, but may be mounted on the lens hood or some other place. In fact, it need not be fixedly attached to the camera so that the camera can be positioned at varying distances from the flare control units. In the embodiment shown in FIGS. 11 and 12, light output may be made further variable by the provision of movable baffles.

Natural light, i.e., sun light, may also be employed for the source for flare light following the basic principles of the present invention. Toward this end and as seen in FIGS. 13 and 14, a camera 95 is provided with an annular flare control device 96 mounted on the resolving lens 97. The flare control device 96 includes a rear wall 100, an outer wall 101, a front wall 102, and an inner wall 103. The outer wall 101 is a "one-way" mirror surface so that it admits sun light about the periphery thereof as indicated by rays 106. The inner surfaces 107 and 108 of front wall 102 and inner wall 103 are reflective so that the light rays entering surface 101 are reflected back and forth within the flare control 96 and emitted through a plurality of apertures 110 adjacent the periphery of lens 92 to provide obliquely incident light to the lens to produce the desired flare effect.

As seen in FIGS. 15 and 16, reflective surfaces are employed to use sun light as the source for the flare light in a somewhat different manner. Viewing FIG. 15, the lens 115 has mounted about the periphery thereof an inner wall 117 and an outer wall 118 having reflective surfaces 119 and 120 that receive natural light through open end 121, reflecting this light back and forth between the inner walls 119 and 120 and emitting the light through a slit or slits 126 to provide the desired oblique light to the lens 115.

In FIG. 16 a somewhat modified form of the device shown in FIG. 15 is illustrated with outer wall 128 and inner wall 129 being curved outwardly and inwardly, respectively, to increase the efficiency of the flare control.

A still further embodiment employing natural light as a source of the flare effect is illustrated in FIG. 16 wherein a flare control device 136 is shown consisting of an annular lens 140. The inner surfaces of the walls 137 and 138 are reflective and wall 138 is split as shown at 141 for the purpose of admitting flare producing light to lens 140. For the purpose of controlling the amount of light to the lens 140 an annular slidable member 142 is mounted within the walls 137 and 138 against wall 138 and has a slit or slits 144 for admitting natural light to the lens 140. For the purpose of axially moving the slitted member 142, an arm 146 is provided extending through an opening in the outer wall 137 to provide manual access thereto. The surfaces of the slitted member 142 also have a reflective surface.

I claim:

1. An apparatus for reducing image light contrast in a camera, comprising: an image light resolving lens, and attachment means for adding light to the image light including means for introducing light to the object side of the lens from a source sufficiently obliquely with respect to the lens to be outside the image bearing light path and to produce a general diffusion of light through the lens, said added light being separate from said image light, said lens resolving the image light and diffusing the added light.

2. An apparatus for reducing image light contrast in a camera as defined in claim 1, wherein said means for introducing light is on the object side of the lens.

3. An apparatus for reducing image light contrast in a camera as defined in claim 1, wherein said means for introducing light surrounds the periphery of the lens in line with the transverse plane of the lens.

4. An apparatus for reducing the contrast of image light in a camera, comprising: an image resolving lens, and attachment means for reducing the contrast of image light passing through the lens including means for adding light to the object side of the lens through the lens from a source sufficiently obliquely to be outside the image bearing light path and to produce a flare effect, said added light being separate from the image light, said lens resolving the image light and diffusing the added light.

5. An apparatus for reducing the contrast of image light in a camera as defined in claim 4, wherein said means for introducing light includes means for introducing natural light.

6. An apparatus for reducing the contrast of image light in a camera as defined in claim 4, wherein said means for introducing light includes an artificial light.

7. An apparatus for reducing the contrast of image light in a camera as defined in claim 4, wherein said means for introducing light includes a stationary ring on the object side of the lens with a plurality of apertures therein, a second ring aligned with said first ring and rotatable relative thereto, said second ring having a plurality of apertures therein positioned to variably register with the apertures in the first ring to control the amount of light added.

8. An apparatus for reducing the contrast of image light in a camera as defined in claim 4, including a hood surrounding the lens on the object side of the lens, said means for introducing light including a reflective surface on the object side of the lens mounted on the inside of the hood.

9. An apparatus for reducing the contrast of image light in a camera as defined in claim 4, wherein said means for adding light includes a plurality of sources of artificial light on the periphery of the lens in line with a transverse plane therethrough.

10. An apparatus for reducing the contrast of image light in a camera as defined in claim 4, wherein said means for adding light includes control means for varying the instantaneous duration of the added light.

11. An apparatus for reducing the contrast of image light in a camera as defined in claim 4, wherein said means for adding light includes an artificial light that simultaneously illuminates the image and adds light to the image light from a single source.

12. An apparatus for reducing the contrast of image light in a camera as defined in claim 4, wherein said means for adding light includes annular means projecting from the lens on the object side of the lens, said annular means having at least one inside reflective surface, and openings in the inside surface of the annular means to permit added light to pass to the lens.

13. An apparatus for reducing the contrast of image light in a camera as defined in claim 4, wherein both inside surfaces of the annular means are reflective.

14. An apparatus for reducing the contrast of image light in a camera as defined in claim 4, including control means for varying the amount of added light.

15. An apparatus for reducing the contrast of image light in a camera, comprising: an image resolving lens, means for reducing the contrast of image light passing through the lens including means for adding light through the lens sufficiently obliquely to produce a flare effect, said means for adding light including a reflective surface surrounding the lens on the object side of the lens, an opening in said surface, and artificial light source means positioned adjacent said opening.

16. An apparatus for reducing the contrast of image light in a camera, comprising: an image resolving lens, and means for reducing the contrast of image light passing through the lens including means for adding light through the lens sufficiently obliquely to produce a flare effect, said means for adding light is responsive to the actuation of the shutter of the associated camera.

17. An apparatus for reducing the contrast of image light in a camera, comprising: an image resolving lens, and attachment means for reducing the contrast of image light passing through the lens including means for adding light to the object side of the lens through the lens from a source sufficiently obliquely to be outside the image bearing light path and to produce a flare effect, said added light being separate from the image light, said lens resolving the image light and diffusing the added light, a light meter positioned away from the path of light through the lens, and calibration means for the light meter to correct the added light so that the proper exposure setting is obtained, said calibration means including a second flare inducing device on said light meter.

18. An apparatus for reducing image light contrast in a camera, comprising: an image light resolving lens; and attachment means for adding light to the image light including means for introducing light at an angle greater than 45 degrees with respect to the optical axis of the image light resolving lens to produce a general diffusion of light through the lens, said added light being separate from said image light, said lens resolving the image light and diffusing the added light.

* * * * *